Dec. 27, 1938. C. P. BALL, JR 2,141,967
HYDRAULIC BRAKE
Filed Oct. 11, 1937 2 Sheets-Sheet 1
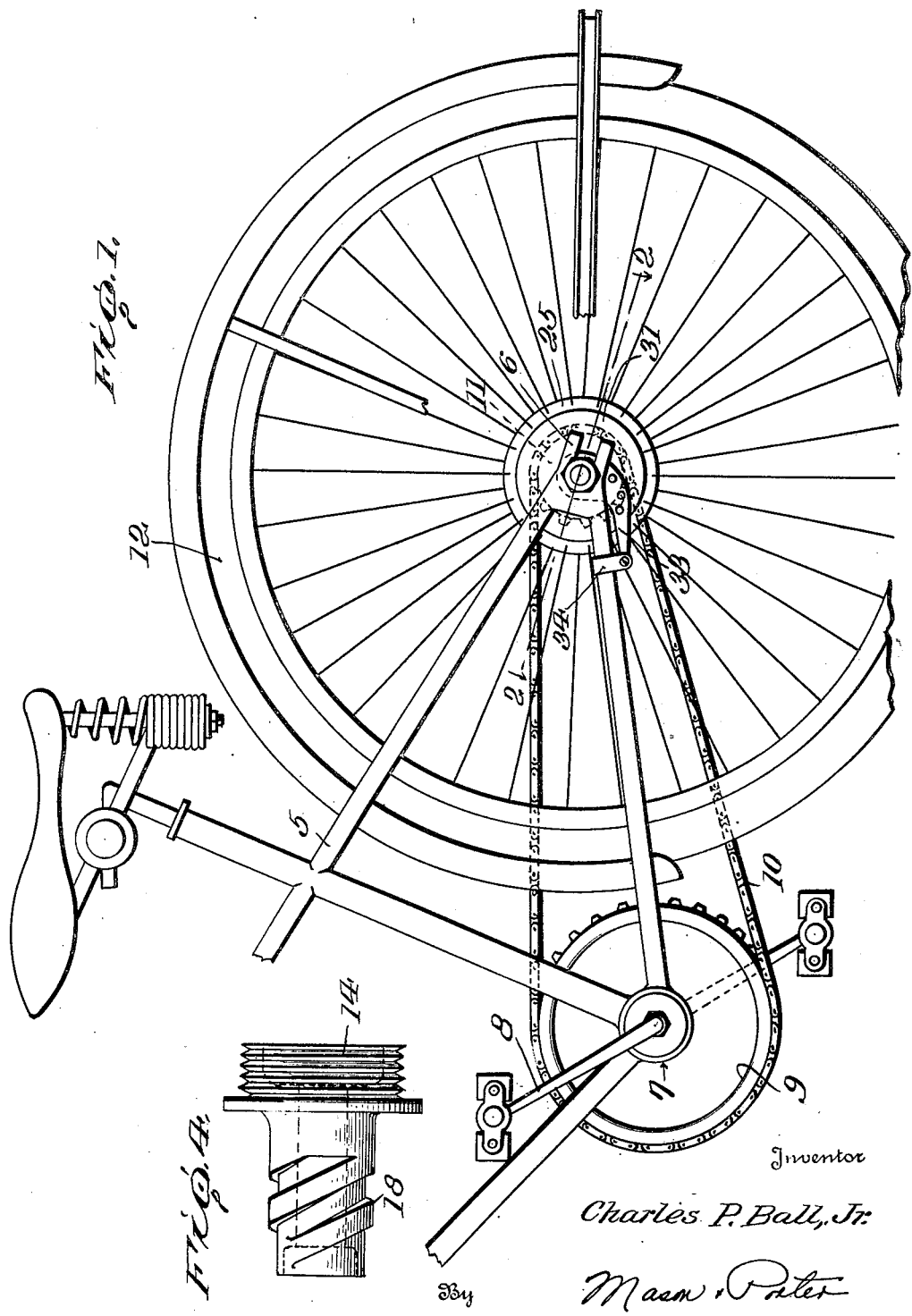
Inventor
Charles P. Ball, Jr.
By Mason & Porter
Attorneys

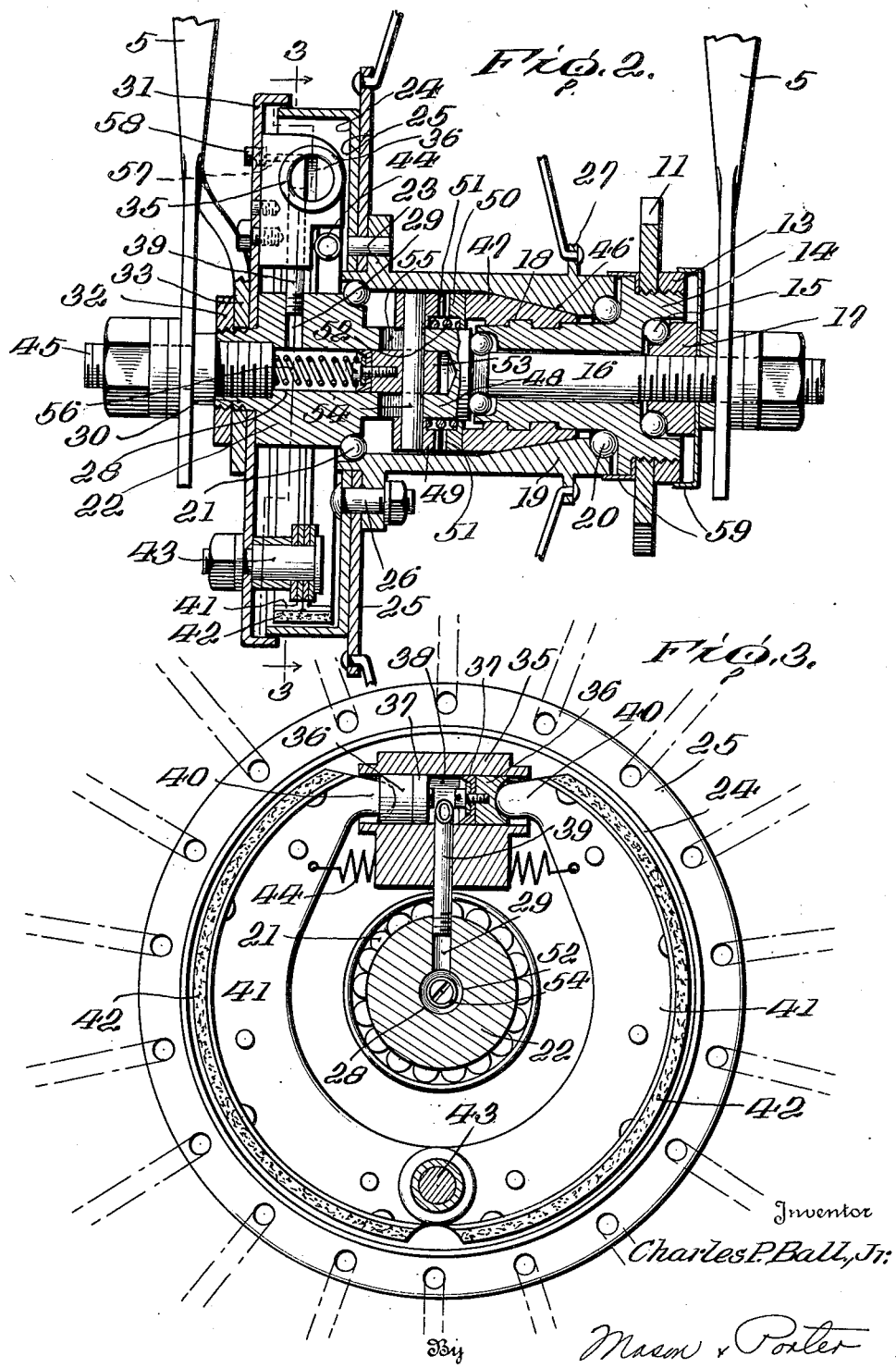

Patented Dec. 27, 1938

2,141,967

UNITED STATES PATENT OFFICE 2,141,967

HYDRAULIC BRAKE

Charles Perry Ball, Jr., Torrington, Conn., assignor to The Torrington Company, Torrington, Conn., a corporation of Connecticut Application October 11, 1937, Serial No. 168,512

7 Claims. (Cl. 192—6)

The invention relates generally to brakes of the hydraulic type and primarily seeks to provide a novel hydraulic braking equipment for use on bicycles, and which is wholly contained within the rear wheel structure of the bicycles upon which it is mounted.

In its more detailed nature, the invention resides in the provision of a novel hydraulic brake equipment for use on bicycles which is controlled by simple back pedaling, or reverse movement of the propelling crank, and which includes novel braking equipment, novel crank actuated clutching and declutching devices, and novel hydraulic pressure applying and releasing means likewise crank actuated, all said parts being built directly into the rear wheel structure of the bicycle.

With these and other objects in view which will more fully appear, the nature of the invention will be more clearly understood by following the description, the appended claims, and the several views illustrated in the accompanying drawings.

In the drawings:—

Figure 1 is a side elevation of a portion of a bicycle equipped with the invention.

Figure 2 is an enlarged longitudinal section illustrating the braking equipment, the section being taken substantially on the line 2—2 on Figure 1.

Figure 3 is a detail vertical cross section taken on the line 3—3 on Figure 2.

Figure 4 is a detail side elevation of the screw sleeve.

The invention is illustrated as applied to a bicycle of conventional form, including the usual frame 5 affording bifurcated bearing at 6 for the rear axle, the usual crank bearing hub 7, driving crank 8, sprocket 9, drive chain 10, driven sprocket 11 and rear wheel 12.

The driven sprocket 11 is secured, as at 13, upon a sleeve 14 which has anti-friction bearing, as at 15, upon one end of the rear axle 16. The sleeve is secured against endwise movement by a cone bearing 17 secured upon the adjacent end of the axle 16, and the external surface of the sleeve 14 is threaded, as at 18, for a purpose that will soon become apparent.

The rear wheel structure includes the usual hub 19 which has anti-friction bearing at one end, as at 20, upon the sleeve 14, and at its other end, as at 21, upon an enlargement 22 of the rear axle member 16. The hub includes a flange 23 to which a brake drum 24 and backing plate 25 are removably secured, as at 26. The wheel spokes are connected to the periphery of the backing plate 25 at one end of the hub, and at the other end to the usual flange equipment 27.

The axle enlargement 22 is axially bored, as at 28, to provide a fluid reservoir, and includes a radial duct 29, the purpose of which will soon be described. The enlarged end of the axle includes a reduced and externally threaded end portion 30. See Figure 2 of the drawings.

A plate, cylinder and brake element assembly co-operates with the brake drum 24, and is removable and replaceable as a unit. This unit includes a carrier plate 31 removably secured, as at 32, upon the end extension 30 of the axle enlargement, and a bracket arm 33 apertured to fit the extension 30 is rigidly secured to the plate and, as at 34, to the frame 5, as shown in Figures 1 and 2 of the drawings. An actuator cylinder 35 is secured in any approved manner to the inner face of the plate 31, and a pair of free pistons 36 are slideably mounted in the cylinder. The opposed faces of the pistons are equipped with flexible, feathered washers 37 and form between them a chamber 38. The chamber 38 communicates with the fluid reservoir 28 and duct 29 through a short pipe line 30, so that pressure exerted in the reservoir 28 will be transmitted to the chamber 38.

The pistons 36 are recessed at their ends to receive the free ends of a pair of brake elements 41 which are equipped with removable and replaceable drum engaging brake shoes 42 of the usual type. The elements 41 are pivoted together and to the carrier plate 31, as indicated at 43 in Figures 2 and 3 of the drawings. The elements 42 are connected adjacent their free ends by a spring 44 which normally holds the brake shoes out of engagement with the internal surface of the brake drum, and tends to move the pistons 36 toward each other, constantly holding the pressure fluid column under pressure.

The axial bore 28 in the axle enlargement is internally threaded at its outer extremity to receive a stub axle extension 45 for co-operating with the other extremity of the axle 16 in mounting the rear wheel assembly in the usual manner, as illustrated in Figures 1 and 2 of the drawings.

The axle hub 19 is provided internally with a cone clutch face 46 which co-operates with a similar face provided on a clutch sleeve 47 threaded on the externally threaded surface of the sleeve 14.

Intermediately of its ends, the rear axle member is provided with an intermediate diameter shank portion 48, on which opposing ring members 49 and 50 are slideably mounted. The ring 50 frictionally engages with the adjacent end of the clutch sleeve 47 and the opposing faces of the rings 49 and 50 are serrated, as at 51, and are shouldered to provide an intermediate space in which a spring 52 is interposed for the purpose of normally holding the serrated faces separated, as shown in Figure 2 of the drawings.

A piston 53 is slideable in the bore 28 and is connected by a transverse pin 54 with the ring 49, the pin being operable in a longitudinal slot 55 provided in the shank portion 48. At its outer end the piston 53 carries a flexible feathered washer, and a spring 56 interposed between the end of the piston and the extension plug 45 serves to hold the piston 53 in the normal position shown in Figure 2 of the drawings.

Dust caps 59 may be provided for protecting the openings between the sleeve 14 and the cone bearing 17, and between the sleeve 14 and the wheel hub 19, as shown in Figure 2.

The column of pressure fluid contained within the actuator cylinder 35, reservoir 28 and ducts 29 and 39 may be replenished when necessary through the filler duct 57 which is closed by a suitable plug 58.

Whenever the bicycle is being propelled forwardly by forward rotation of the crank and sprocket equipment, the threaded engagement between the sleeves 14 and 47 will act to hold the cone clutch surfaces tightly engaged and the rotation of the sleeve 14 will be imparted through the sleeve 47 to the wheel hub 19. However, whenever the operator of the bicycle back-pedals, or turns the crank member 8 in the reverse direction, the reverse rotation of the sleeve 14 and the threaded engagement thereof in the clutch sleeve 47 will cause the latter to move longitudinally along the sleeve 14 in a direction for disengaging the cone clutch surfaces. Any tendency of the sleeve 47 to rotate with the sleeve 14 after the cone clutch surfaces have been disengaged is overcome by contact of the serrated surfaces 51 of the rings 49 and 50. Continued reverse rotation of the sleeve 14 and longitudinal movement of the sleeve 47 and rings 49 and 50 will cause longitudinal movement to the piston 53 and the setting up of pressure in the liquid column contained in the reservoir 28, ducts 29 and 39 and in the cylinder chamber 38. This pressure will cause the pistons 36 to separate and apply the brake shoes 42 to the internal surface of the brake drum 24. When the crank member 8 is again moved in the forward direction pressure in the fluid column will be relieved and the spring 44 will return the parts to the normal position, shown in Figure 2 of the drawings. A slight amount of forward rotation of the crank member 8 will return the cone clutch surfaces to the normal position shown in Figure 2 of the drawings, again connecting the driven sprocket 11 and the hub 19 in driving relation.

In the foregoing description there is disclosed a simple, compact braking equipment wholly contained within the rear wheel structure of the bicycle and controlled by a simple back-pedaling or reverse rotation of the crank member. The equipment includes a simple plate cylinder and brake element assembly removable and replaceable as a unit, and the brake drums are relatively large in size and afford a great amount of braking surface, thus increasing the life and efficiency of the braking equipment, and because of the great amount of radiating surface provided enabling frequent use of the brake without overheating. Means also is provided for constantly holding the fluid column under pressure in a manner increasing the speed and efficiency of operation of the brakes and reducing to a minimum seepage of the pressure fluid.

I claim:
1. In a bicycle, the combination of a driving wheel having a hub, an axle on which said hub is mounted for rotation, a propelling crank and power transmitting connections therefor, a brake drum attached to said hub and having a braking surface disposed radially outward from the hub, an hydraulic braking means disposed within said drum and including a fluid actuator cylinder, a fluid reservoir disposed axially of the hub, a fluid conduit connecting the reservoir with the actuator cylinder, means operable upon back pedaling of the crank for exerting pressure against the fluid in the reservoir and effecting a brake application, and means for releasing the brake when the pressure on the fluid is relieved.

2. In a bicycle, the combination of a driving wheel having a hub, an axle, a brake drum attached to said hub and having a braking surface disposed radially outward from the hub, an hydraulic braking means disposed within the drum including a fluid actuator cylinder, a reservoir disposed axially of the hub, a fluid conduit connecting the reservoir and cylinder, a piston associated with said reservoir for applying pressure to the fluid for operating the braking means, a driving member mounted for rotation on the axle, a clutch sleeve having threaded engagement with said driving member, devices connected to said piston, means operated by the driving member for moving said clutch sleeve endwise in one direction for engagement with the hub for driving the wheel and endwise in the opposite direction for engagement with said devices for applying the brake, and friction means for restraining the rotations of the clutch sleeve.

3. In a bicycle, the combination of a driving wheel having a hub, an axle, a brake drum attached to said hub and having a braking surface disposed radially outward from the hub, an hydraulic braking means disposed within the drum including a fluid actuator cylinder, a reservoir disposed axially of the hub, a fluid conduit connecting the reservoir and cylinder, a piston associated with said reservoir for applying pressure to the fluid for operating the braking means, a driving member mounted for rotation on the axle, a clutch sleeve having threaded engagement with said driving member, said hub having a friction driving surface adapted to be engaged by said sleeve, devices connected to said piston, means operated by the driving member for moving said clutch sleeve endwise in one direction for engagement with the hub for driving the wheel and endwise in the opposite direction for engagement with said devices for applying the brake, friction means for restraining the rotations of the clutch sleeve, and spring means for releasing the braking means from the braking surface and returning the piston to normal position when the pressure of the clutch sleeve thereon is released.

4. In a bicycle, the combination of a driving wheel having a hub, an axle on which said hub is mounted for rotation, a propelling crank and power transmitting connections therefor, a brake drum attached to said hub and having a braking surface disposed radially outward from the hub, an hydraulic braking means disposed within said hub and including a fluid actuator cylinder, a fluid reservoir disposed axially of the hub, a fluid conduit connecting the reservoir with the fluid actuator cylinder, a piston associated with said reservoir for applying pressure to the fluid for operating the braking means, a spring operating on said piston for moving the same to normal set position with the fluid relieved from pressure, and means operable upon back pedaling of the crank for moving the piston for exerting pressure on the fluid and effecting a brake application.

5. In a bicycle, the combination of a driving wheel having a hub, an axle on which said hub is mounted for rotation, a propelling crank and power transmitting connections therefor, a brake drum attached to said hub and having a braking surface disposed radially outward from the hub, an hydraulic braking means disposed within said hub and including a fluid actuator cylinder, a fluid reservoir disposed axially of the hub, a fluid conduit connecting the reservoir with the fluid actuator cylinder, a piston associated with said reservoir for applying pressure to the fluid for operating the braking means, a spring operating on said piston for moving the same to normal set position with the fluid relieved from pressure, a driving member mounted for rotation on the axle actuated by said propelling crank, a clutch sleeve having threaded engagement with said driving member, devices connected to said piston, means operated by the driving member for moving said clutch sleeve endwise in one direction for engagement with the hub for driving the wheel and endwise in the opposite direction for engagement with said devices for applying the brake, and friction means for restraining the rotations of the clutch sleeve.

6. In a bicycle, the combination of a driving wheel having a hub, an axle, a brake drum attached to said hub and having a braking surface disposed radially outward from the hub, an hydraulic braking means disposed within the drum including a fluid actuator cylinder, a reservoir disposed axially of the hub, a fluid conduit connecting the reservoir and cylinder, a piston associated with said reservoir for applying pressure to the fluid for operating the braking means, a driving member mounted for rotation on the axle, a clutch sleeve having threaded engagement with said driving member, said hub having a friction driving surface adapted to be engaged by said sleeve, a member movable endwise on the axle and held from rotation thereby, said member being connected to said piston, a collar on said axle, spring means for holding said collar continuously in frictional engagement with said sleeve, said collar being moved by said sleeve into engagement with the member attached to the piston for applying the brake.

7. In a bicycle, the combination of a driving wheel having a hub, an axle, a brake drum attached to said hub and having a braking surface disposed radially outward from the hub, an hydraulic braking means disposed within the drum including a fluid actuator cylinder, a reservoir disposed axially of the hub, a fluid conduit connecting the reservoir and cylinder, a piston associated with said reservoir for applying pressure to the fluid for operating the braking means, a driving member mounted for rotation on the axle, a clutch sleeve having threaded engagement with said driving member, said hub having a friction driving surface adapted to be engaged by said sleeve, a member movable endwise on the axle and held from rotation thereby, said member being connected to said piston, a collar on said axle, spring means for holding said collar continuously in frictional engagement with said sleeve, said collar being moved by said sleeve into engagement with the member attached to the piston for applying the brake, said member attached to the piston and said collar having their engaging surfaces roughened so that said collar will be held from rotation when pressed against the member connected to the piston.

CHARLES PERRY BALL, Jr.